US010114850B1

(12) United States Patent
Dangi et al.

(10) Patent No.: US 10,114,850 B1
(45) Date of Patent: Oct. 30, 2018

(54) DATA STREAM GENERATION USING PRIME NUMBERS

(71) Applicant: EMC IP Holding Company LLC, Hopkinton, MA (US)

(72) Inventors: Salil Dangi, Mission Viejo, CA (US); James Zarbock, Lake Forest, CA (US); Ernest Daza, Rancho Santa Margarita, CA (US); Scott H. Ogata, Lake Forest, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 506 days.

(21) Appl. No.: 14/489,295

(22) Filed: Sep. 17, 2014

(51) Int. Cl.
G06F 17/30 (2006.01)

(52) U.S. Cl.
CPC .. G06F 17/30371 (2013.01); G06F 17/30575 (2013.01); *G06F 17/30067* (2013.01); *G06F 17/30489* (2013.01)

(58) Field of Classification Search
CPC .......... G06F 17/30457; G06F 17/3048; G06F 17/30336; G06F 17/30067; G06F 17/30489; G06F 3/0641; G06F 9/52; G06F 17/30371; G06F 17/30575
See application file for complete search history.

(56) References Cited

U.S. PATENT DOCUMENTS

| 6,307,938 | B1 * | 10/2001 | Matyas, Jr. | G06F 7/72 380/44 |
| 6,430,732 | B1 | 8/2002 | Hwang | |
| 8,112,802 | B2 * | 2/2012 | Hadjieleftheriou | G06F 21/6227 707/687 |
| 8,290,150 | B2 * | 10/2012 | Erhart | H04L 9/302 380/44 |
| 8,638,926 | B2 * | 1/2014 | Schneider | H04L 9/085 380/277 |
| 8,660,994 | B2 | 2/2014 | Slater | |
| 2010/0017436 | A1 * | 1/2010 | Wolge | G06F 17/3048 707/E17.055 |
| 2011/0119432 | A1 | 5/2011 | Yoon | |
| 2011/0299581 | A1 * | 12/2011 | Le-Gall | G01R 31/31838 375/224 |
| 2012/0233135 | A1 | 9/2012 | Tofano | |
| 2014/0279874 | A1 * | 9/2014 | Reiter | G06F 11/3414 707/610 |

OTHER PUBLICATIONS

Author Unknown, Mac Performance Guide, Understanding Compressible vs Incompressible Data, May 6, 2012, macperfomanceguide. com/SSD-incompressible-vs-compressible-data.html.

(Continued)

*Primary Examiner* — Pierre Vital
*Assistant Examiner* — Andalib Lodhi
(74) *Attorney, Agent, or Firm* — Van Pelt, Yi & James LLP

(57) ABSTRACT

Data stream generation using prime numbers is disclosed, including: receiving an initialization parameter; and using the initialization parameter to generate a data stream comprising a merging of a first sequence and a second sequence, wherein the first sequence is generated using a first prime number and the initialization parameter and the second sequence is generated using a second prime number and the initialization parameter.

15 Claims, 5 Drawing Sheets

(56) References Cited

OTHER PUBLICATIONS

Eric W. Weisstein, Goldbach Conjecture, Jun. 7, 2000, mathworld.wolfram.com/goldbachconjecture.html.
Matt Bach, Puget Systems, SSDs: Advertised vs. Actual Performance, Jan. 25, 2016, pugetsystems.com/labs/articles/SSDs-Advertised-vs-Actual- Performance-179/.
M. Ram Murty. Prime Numbers and Irreducible Polynomials, May 2002, The Mathematical Association of America, Monthly 109, p. 452.

* cited by examiner

DATA STREAM GENERATION USING
PRIME NUMBERS

BACKGROUND OF THE INVENTION

Certain applications require various sets of data for testing purposes. While real user data can be used for testing, such data changes slowly and infrequently. As such, non-user data can be generated and used for testing. Conventionally, testing data is generated by hashing and/or cryptography techniques. However, generating testing data by hashing and/or cryptography techniques may be slow and inefficient.

Furthermore, in conventional systems, a master copy of a data stream is needed to verify another copy of the data stream. The master copy of the data stream can be compared to the other copy of the data stream to determine whether the values of the data stream to be verified match those of the master copy. However, it may not be feasible and/or too costly to maintain a master copy of each data stream that is to be verified.

BRIEF DESCRIPTION OF THE DRAWINGS

Various embodiments of the invention are disclosed in the following detailed description and the accompanying drawings.

DETAILED DESCRIPTION

Figure 1:
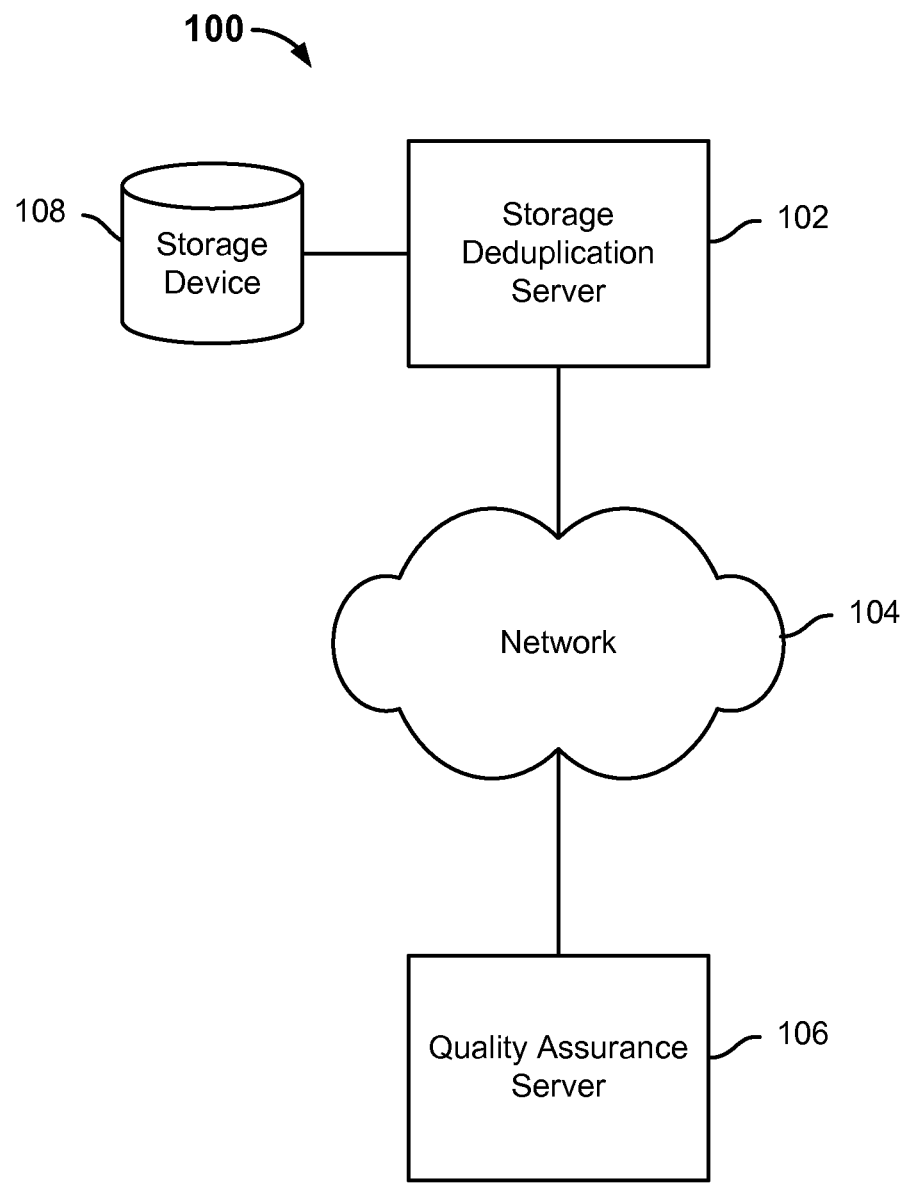
FIG. 1 is a diagram showing an embodiment of a system for performing quality assurance on a storage duplication server.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Embodiments of data stream generation using prime numbers are described herein. An initialization parameter is received. In some embodiments, the initialization parameter is any value selected from a constrained address space. In various embodiments, a "sequence" refers to a sequence of values that is generated using an initialization parameter and a prime number. In some embodiments, a first sequence is generated using a first prime number and the initialization parameter. In some embodiments, a second sequence is generated using a second prime number and the initialization parameter. In some embodiments, the first prime number and the second prime number are selected based on a revision parameter that is received. In some embodiments, each of the first prime number and the second prime number is selected from a constrained modified set of prime numbers. A data stream is generated by merging (e.g., interleaving) the first sequence and the second sequence. In various embodiments, a "data stream" refers to a sequence of values that is determined by the merging (e.g., interleaving) of at least two sequences. In some embodiments, a data stream can be referred to as a "merged sequence." In some embodiments, a data stream is non-deduplicatable. In various embodiments, a non-deduplicatable data stream comprises a data stream that does not include duplicate blocks of data (e.g., that can be identified by a deduplication system for a block size recognized by the deduplication system). Given a technique to generate a data stream that is not deduplicatable, other techniques can then be used to generate a data stream with a specific level of deduplication. In certain testing scenarios the specification of a specific deduplication level is very desirable.

In some embodiments, a data stream is generated at a high speed of approximately 2.3+GB per second on 64-bit machines with a single CPU. In some embodiments, a data stream is 100% reproducible on any computer. In some embodiments, a data stream does not repeat any block for 20PB or more. In some embodiments, four billion or more unique data streams can be generated. In some embodiments, a data stream is unique from any other data stream generated from a different initialization parameter and/or a different pair of prime numbers. Furthermore, any block of a data stream is different from any block of any other data stream generated from a different initialization parameter and/or a different pair of prime numbers.

Embodiments of verifying a data stream without a master copy of the data stream or the parameters used to generate the data stream are described herein. In various embodiments, the parameters used to generate the data stream include at least the initialization parameter, the first prime number, and the second prime number. Whereas conventionally, a master copy (e.g., an original copy of the data stream that is used as a reference copy) of a data stream is required to perform verification of the data stream (e.g., as restored from a storage), as will be described in further detail below, a data stream as generated by embodiments described herein can be verified without a master copy of the data stream and/or even the parameters used to generate the data stream.

FIG. 1 is a diagram showing an embodiment of a system for performing quality assurance on a storage duplication server. In the example, system 100 includes storage deduplication server 102, storage device 108, network 104, and quality assurance server 106. Network 104 includes high-speed data networks and/or telecommunication networks. Storage device 108 comprises a single storage device such as a hard disk, a tape drive, a semiconductor memory, a plurality of storage devices such as a redundant array system (e.g., a redundant array of independent disks (RAID)), a system for storage such as a library system or network attached storage system, or any other appropriate storage device or system.

System 100 includes a quality assurance environment in which quality assurance server 106 generates data streams that are sent over network 104 to storage deduplication server 102. Storage deduplication server 102 is configured to deduplicate data that it receives from quality assurance server 106 with respect to data that is already stored at storage device 108. Storage device 108 is attached to or otherwise accessible by storage deduplication server 102. For example, storage deduplication server 102 comprises a backup server that is configured to store at storage device 108 backup data received from a source location (e.g., quality assurance server 106). In some embodiments, storage deduplication server 102 is configured to segment each received data stream into data blocks (e.g., of a fixed size or of variable sizes) and perform deduplication with respect to each data block. For example, a data stream comprises a sequence of values and each data block comprises one or more values. In various embodiments, "deduplicating a data block" refers to determining whether the data block to be stored has already been stored at a target location (e.g., storage deduplication server 102 and/or storage device 108). In the event that the data block has not already been stored at the target location, the data block is stored at the target location (e.g., by storage deduplication server 102). Otherwise, in the event that the data block has already been stored at the target location, a reference, pointer, link, and/or other associating data to the previously stored data block is stored at the target location (e.g., by storage deduplication server 102) instead of another instance of the data block. In various embodiments, a reference, pointer, link, and/or other associating data to the stored data block comprises a relatively smaller amount of data relative to the amount of data associated with the data block. When a data stream stored at storage device 108 is to be restored (e.g., at the source location), the stored data blocks and/or references to stored data blocks associated with the data stream can be used to reconstruct the data stream. Deduplication can be used to reduce the amount of data that is stored at the target location by only storing new (non-duplicate) data that has not yet been stored at the target location and by storing references to data that has been previously stored at the target location.

For example, the parameters used in the generation of data streams and/or other attributes associated with the data streams are at least known to if not also controlled by quality assurance server 106. How storage deduplication server 102 performs deduplication with respect to storing at least two data streams that it receives from quality assurance server 106 given known data such as, for example, the percentage of difference in data between the two data streams, may indicate a deduplication result (e.g., a quality and/or effectiveness) of the storage deduplication techniques used by storage deduplication server 102. The deduplication result can be used to determine whether the deduplication techniques used by storage deduplication server 102 should be reconfigured, for example.

In some embodiments, quality assurance server 106 is configured to generate a data stream based on parameters such as an initialization parameter (sometimes referred to as a "seed value") and two prime numbers selected from a constrained modified set of prime numbers. In some embodiments, each pair of two prime numbers to be used with the initialization parameter (seed value) is selected based on a received revision parameter (sometimes referred to as a "revision value" and where two different revision values with respect to the same initialization parameter each maps to a different pair of prime numbers). A sequence is determined for the initialization parameter and each of the two prime numbers. In various embodiments, a data stream is determined by merging (e.g., interleaving) the two sequences. For example, merging the two sequences comprises creating a new (merged) sequence that includes each value from the first sequence followed by a corresponding value from the second sequence. For example, a first value from the first sequence that corresponds to a second value from the second sequence is associated with the same position within the first sequence as the second value is within the second sequence (e.g., a first value in position 1 of the first sequence corresponds to a second value in position 1 of the second sequence).

In some embodiments, this generated data stream is sent by quality assurance server 106 over network 104 to storage deduplication server 102 (e.g., as part of a test backup operation) for storage. Storage deduplication server 102 is configured to segment the data stream into data blocks (e.g., of fixed or variable sizes) and store only the new data blocks (e.g., data blocks that have not already been stored at storage device 108). If, for example, in a test backup operation, none of the data blocks of the data stream have already been stored at storage device 108, storage deduplication server 102 will store all the data blocks of the data stream. If, for example, in a test backup operation, some of the data blocks of the data stream have already been stored at storage device 108, storage deduplication server 102 will store references in place of the data blocks that have already been stored and store all the remaining data blocks of the data stream. Because the data stream is not deduplicatable, storage deduplication server 102 will not identify any duplicate data blocks within the data stream.

After the data stream is stored by storage deduplication server 102, the stored data stream may be restored. For example, restoring a stored data stream includes reconstructing the data stream using the stored data blocks and/or references to stored data blocks associated with the data stream. To test the accuracy or reliability of the storage deduplication techniques and/or the restoration techniques used by storage deduplication server 102, in some embodiments, quality assurance server 106 is configured to verify the data stream that was stored by and thereafter restored by the storage deduplication server 102. In some embodiments, quality assurance server 106 is configured to verify the correctness of the restored data stream by comparing the restored data stream to the original data stream that quality assurance server 106 had generated and then sent to storage deduplication server 102. As will be described in further detail below, in various embodiments, the restored data stream itself can be used to verify its correctness without requiring a master copy of the original data stream and/or the parameters used to generate the original data stream, thereby eliminating the need to maintain a master copy of the data stream for verification purposes.

System 100 shows one example in which embodiments of data stream generation as described herein can be applied. Data stream generation may be applied in various other applications, as appropriate.

Figure 2:
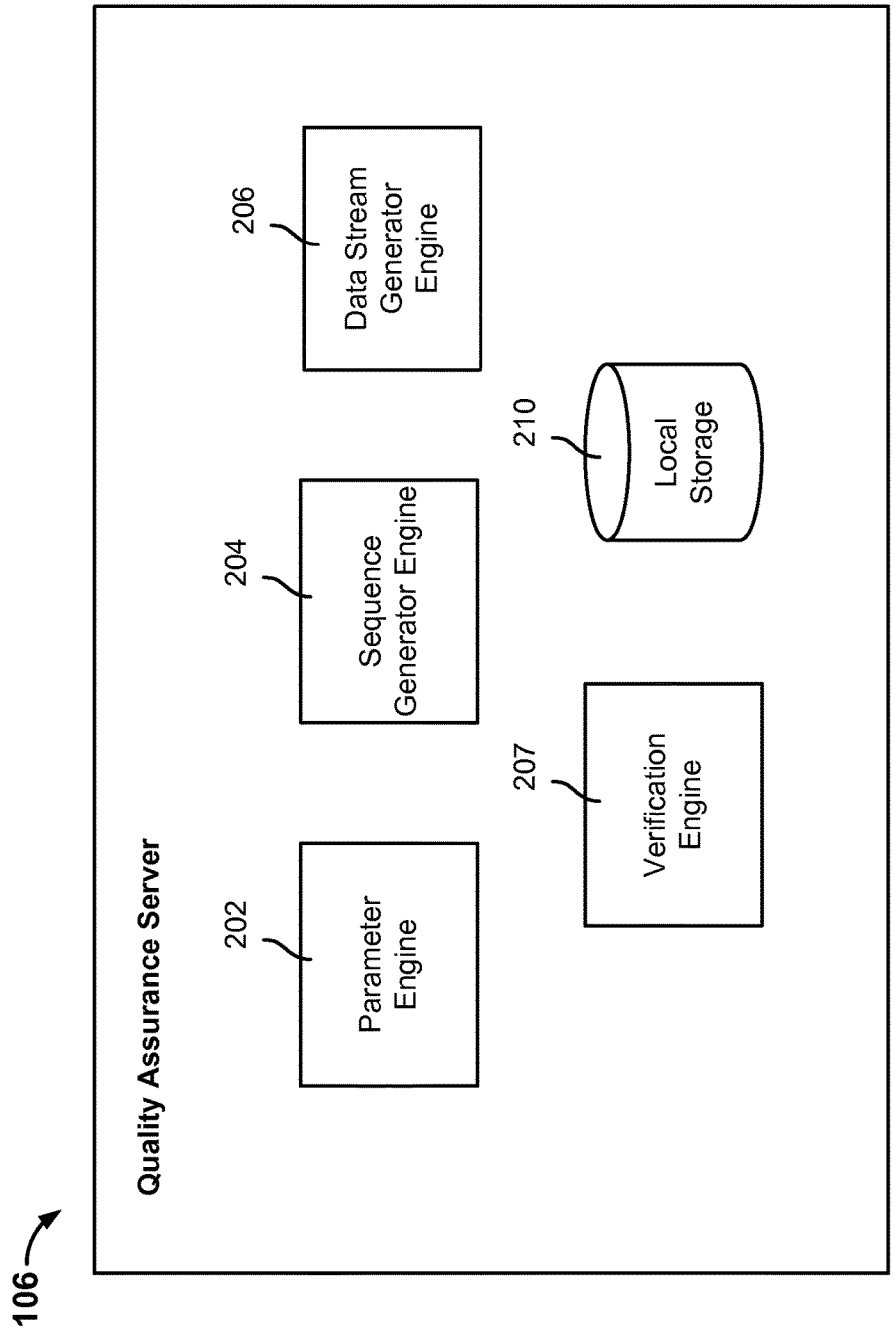
FIG. 2 is a diagram showing an embodiment of a quality assurance server.

FIG. 2 is a diagram showing an embodiment of a quality assurance server. In some embodiments, quality assurance server 106 of system 100 of FIG. 1 can be implemented using the example of FIG. 2. The quality assurance server of FIG. 2 includes parameter engine 202, sequence generator engine 204, data stream generator engine 206, verification engine 207, and local storage 210. Each of parameter engine 202, sequence generator engine 204, data stream generator engine 206, and verification engine 207 can be implemented using one or both of software and hardware. Local storage 210 comprises a local storage or a networked file system storage.

Parameter engine 202 is configured to provide parameters to use to generate a data stream. In some embodiments, an initialization parameter is a seed value. In some embodiments, the seed value is any value selected from an address space that is represented by N bits (e.g., the address space comprising $(0, \ldots, 2^N-1)$). N can be selected to be any positive integer. For example, if N=5, then $2^{N=5}=32$ so the address space is $(0, \ldots, 31)$ and the initialization parameter can be selected to be any value from $(0, \ldots, 31)$. In some embodiments, a revision parameter is a revision value associated with a given "seed value" that uniquely maps to at least two prime numbers. In some embodiments, each of the at least two prime numbers is selected from a set of prime numbers that is modified to exclude "2" and include "1" and is also constrained/bounded by $2^N-1$.

In some embodiments, one or more of the initialization parameter (the seed value) and the revision parameter (the revision value), which maps to two or more prime numbers, are input by a user (e.g., associated with performing quality assurance). In some embodiments, one or more of the initialization parameter and the revision parameter, which maps to two or more prime numbers, are generated by a computer program.

In various embodiments, parameter engine 202 is configured to provide the initialization parameter and the revision parameter to sequence generator engine 204.

Sequence generator engine 204 is configured to receive the initialization parameter and the revision parameter from parameter engine 202 to use to generate at least two sequences. In some embodiments, sequence generator engine 204 is configured to generate a sequence using each pair of the initialization parameter and a prime number selected using the revision parameter received from parameter engine 202. An example technique by which to generate each such sequence is described in more detail below. For example, if the revision parameter that was received from parameter engine 202 maps to two prime numbers, then sequence generator engine 204 will generate two corresponding sequences. Similarly, if the revision parameter that was received from parameter engine 202 maps to three prime numbers, then sequence generator engine 204 will generate three corresponding sequences. In some embodiments, sequence generator engine 204 is configured to send the generated sequences and/or the corresponding given set of the initialization parameter and the revision parameter received from parameter engine 202 to be stored at local storage 210. In some embodiments, sequence generator engine 204 is configured to send the generated sequences and/or the corresponding given set of the initialization parameter and the revision parameter to data stream generator engine 206 for data stream generator engine 206 to use to generate a data stream.

Data stream generator engine 206 is configured to receive the at least two sequences and/or the corresponding given set of the initialization parameter and the revision parameter from sequence generator engine 204. In some embodiments, data stream generator engine 206 is configured to merge the at least two sequences into one new (merged) sequence that serves as the generated data stream. In some embodiments, the at least two sequences are merged into one sequence by creating a new merged sequence in which each value from the first sequence is followed by a corresponding value from each other sequence (i.e., the two sequences are interleaved). For example, of the two sequences that are to be merged to become the data stream, the first sequence comprises {S11, S12, S13, . . . } and the second sequence comprises {S21, S22, S23, . . . }. In this example, merging the first and second sequences will yield the following data stream {S11, S21, S12, S22, S13, S23, . . . }. In some embodiments, data stream generator engine 206 is configured to send the generated data stream and/or the corresponding given set of the initialization parameter and the revision parameter to store at local storage 210. In some embodiments, data stream generator engine 206 is configured to send the generated data stream to an external destination (e.g., storage deduplication server 102 of system 100 of FIG. 1).

Verification engine 207 is configured to receive a data stream and verify the data stream without another (e.g., a master) copy of the data stream or the parameters (e.g., the initialization parameter, the first prime number, and the second prime number) that were used to generate the data stream. For example, the data stream to be verified is data restored from a storage device (e.g., by storage deduplication server 102 of system 100 of FIG. 1). It may be desirable to verify the received data stream to determine that the values of the data stream correctly match the pattern of values associated with a merging (e.g., interleaving) of two (or more) sequences generated by an initialization parameter and (at least) two prime numbers even if none of the initialization parameter and two prime numbers are known/retrieved prior to the start of the verification process. In some embodiments, verification engine 207 is configured to use a portion of the data stream to deduce the values of the first prime number and the second prime number and then use the first prime number and the second prime number to verify at least a portion of the data stream. For example, verifying the data stream includes determining whether the difference between every other value of the data stream alternately equals the first prime number and the second prime number. For example, if the data stream can be successfully verified, then the techniques used to restore the data stream from the storage device can be determined to be effective. Otherwise, if the data stream cannot be successfully verified, then the techniques used to restore the data stream from the storage device can be determined to be ineffective and reconfiguration is needed.

Figure 3:
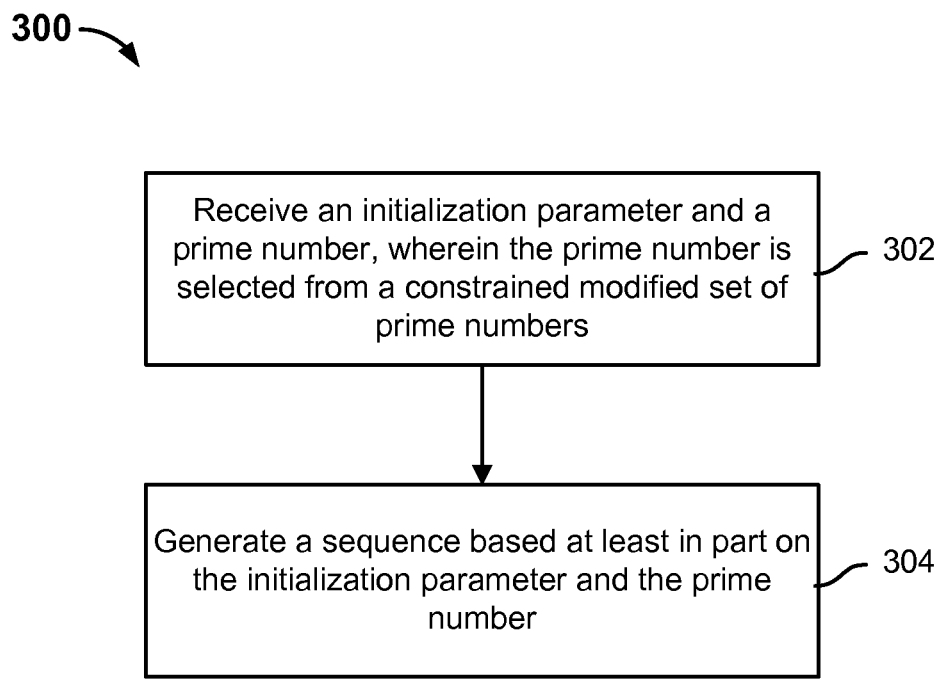
FIG. 3 is a flow diagram showing an embodiment of a process of generating a sequence using an initialization parameter and a prime number.

FIG. 3 is a flow diagram showing an embodiment of a process of generating a sequence using an initialization parameter and a prime number. In some embodiments, process 300 is implemented at system 100 of FIG. 1. Specifically, in some embodiments, process 300 is implemented at quality assurance server 106 of system 100 of FIG. 1.

Parameters may be provided to use to generate a data stream. Such parameters include an initialization parameter (e.g., a starting value or seed value) and a revision parameter (e.g., a revision value). The revision value maps to or is used to select at least two prime numbers from a constrained modified set of prime numbers. Process 300 can be performed to generate a sequence for each pair of the initialization parameter and a prime number (selected using the revision parameter). For example, if an initialization parameter (seed) and a revision parameter that maps to two prime numbers (prime1 and prime2) were received, then process 300 can be performed twice: once to generate a first sequence using the seed and prime1 and a second time to generate a second sequence using the seed and prime2. For example, the first and second sequences can be used to generate a data stream using another process (e.g., process 400 of FIG. 4, below).

At 302, an initialization parameter and a prime number are received, wherein the prime number is selected from a constrained modified set of prime numbers. For example, the initialization parameter can be received from a user input or from a computer program. In some embodiments, the initialization parameter comprises a seed value that is selected from an address space $(0, \ldots, 2^N-1)$, where N is selected to be any positive integer (e.g., 32). In some embodiments, the prime number is selected by/mapped to by a received revision parameter (e.g., a revision value associated with the seed value). The prime number is selected from a modified set of prime numbers that excludes "2" but includes "1" and that is bounded/constrained by $2^N-1$.

At 304, a sequence is generated based at least in part on the initialization parameter and the prime number. In some embodiments, the sequence is of length $2^N$. In various embodiments, the first value of the sequence is the initialization parameter (starting value or seed value). Each subsequent value of the sequence is determined as a function of the prior value in the sequence, the prime number, and $2^N$. For example, each subsequent value of the sequence is determined as the sum of the prior value in the sequence and the prime number and then the sum modulo $2^N$. In some embodiments, sequences generated using the same initialization parameter but different prime numbers will not have any blocks of values (e.g., 8 KiB in size) in common with each other.

An example of generating a sequence using an initialization parameter (seed value) and a prime number is described below:

Below are some definitions that will be used by the following examples:
prime: Any natural prime number
Prime: Set of natural prime numbers (2, 3, 5, 7, . . . )
PrimeM: A set of prime numbers that excludes 2 (even though "2" is considered a prime number) from the set Prime and includes 1 (even though "1" is not considered a prime number)
primeM: A member of the set PrimeM
PrimeN: Set of prime numbers that are less than $2^N-1$
PrimeMN: Set of primeM numbers that are less than $2^N-1$
Example sets of prime numbers:
Prime5=[2, 3, 5, 7, 11, 13, 17, 19, 23, 29, 31]
PrimeM5=[1, 3, 5, 7, 11, 13, 17, 19, 23, 29, 31]
Prime6=[2, 3, 5, 7, 11, 13, 17, 19, 23, 29, 31, 37, 41, 43, 47, 53, 59, 61]
PrimeM6=[1, 3, 5, 7, 11, 13, 17, 19, 23, 29, 31, 37, 41, 43, 47, 53, 59, 61]
Regarding the set PrimeMN For a given address space $(0 \ldots 2^N-1)$ and a given a number s (seed value) in the chosen address space, if any specific number from the PrimeMN set is added to seed value s (with modulo-$2^N$), then the resulting sequence will repeat only after all numbers in the address space have been visited. This is not true for the set PrimeN as this property will not hold for the prime number 2. However, this property also holds for the number 1. That is the reason for excluding 2 and including 1 to the set PrimeMN. In some embodiments, set PrimeMN is sometimes referred to as a "constrained modified set of prime numbers."

Below is an example of generating a sequence:
Address space is N=5 bits (so the address space includes (0 . . . 31)),
PrimeM5 is set [1, 3, 5, 7, 11, 13, 17, 19, 23, 29, 31],
The selected seed value (e.g., the initialization parameter) (which is any number between 0 . . . 31 inclusive) is 14,
The selected primeM5 is 3.
The resulting sequence S(N, seed, prime) will be as follows:
S(5, 14, 3)=14, 17, 20, 23, 26, 29, 0, 3, 6, 9, 12, 15, 18, 21, 24, 27, 30, 1, 4, 7, 10, 13, 16, 19, 22, 25, 28, 31, 2, 5, 8, 11

The following table, Table 1, illustrates that the values of sequence S(5, 14, 3) are obtained by using the seed value (14) as the first value of the sequence and obtaining each subsequent value in the sequence by incrementing the previous value in the sequence by the prime number (3) with modulo $2^{N=5}=32$:

TABLE 1

|    | Start | +3 | +3 | +3 | +3 | +3 | +3 | +3 |      |
|----|-------|----|----|----|----|----|----|----|------|
| +3 | 14    | 17 | 20 | 23 | 26 | 29 | 0  | 3  | Next |
| +3 | 6     | 9  | 12 | 15 | 18 | 21 | 24 | 27 | Next |
| +3 | 30    | 1  | 4  | 7  | 10 | 13 | 16 | 19 | Next |
| +3 | 22    | 25 | 28 | 31 | 2  | 5  | 8  | 11 | End  |

This holds true for any selected member from the set PrimeM5.

In the above example, if the seed value was changed to 10 then the resulting sequence will be as follows:
S(5, 10, 3)=10, 13, 16, 19, 22, 25, 28, 31, 2, 5, 8, 11, 14, 17, 20, 23, 26, 29, 0, 3, 6, 9, 12, 15, 18, 21, 24, 27, 30, 1, 4, 7

The following table, Table 2, illustrates that the values of sequence S(5, 10, 3) are obtained by using the seed value (10) as the first value of the sequence and obtaining each subsequent value in the sequence by incrementing the previous value in the sequence by the prime number (3) with modulo $2^{N-5}=32$:

TABLE 2

|    | Start | +3 | +3 | +3 | +3 | +3 | +3 | +3 |      |
|----|-------|----|----|----|----|----|----|----|------|
| +3 | 10    | 13 | 16 | 19 | 22 | 25 | 28 | 31 | Next |
| +3 | 2     | 5  | 8  | 11 | 14 | 17 | 20 | 23 | Next |
| +3 | 26    | 29 | 0  | 3  | 6  | 9  | 12 | 15 | Next |
| +3 | 18    | 21 | 24 | 27 | 30 | 1  | 4  | 7  | End  |

The sequences S(5, 14, 3) and S(5, 10, 3) are basically the same except for the rotation in the positions of their respective values. The values of sequence S(5, 14, 3) can be found starting from value 14 of sequence S(5, 10, 3), which is underlined in Table 2, above.

However, for example, if each value were represented by 32 bits, then if a different prime number is selected, then the resulting sequence will not have any blocks (e.g., blocks that are 8 KiB in size) of values in common with any other sequence.

In another example where the seed value is 14 and the selected primeM5 is 5:

S(5, 14, 5)=14, 19, 24, 29, 2, 7, 12, 17, 22, 27, 0, 5, 10, 15, 20, 25, 30, 3, 8, 13, 18, 23, 28, 1, 6, 11, 16, 21, 26, 31, 4, 9

The following table, Table 3, illustrates that the values of sequence S(5, 14, 5) are obtained by setting the first value to the seed value (14) and obtaining each subsequent value in the sequence by incrementing the previous value in the sequence by the prime number (5) with modulo $2^{N=5}=32$:

TABLE 3

|  | Start | +5 | +5 | +5 | +5 | +5 | +5 | +5 | |
|---|---|---|---|---|---|---|---|---|---|
| +5 | 14 | 19 | 24 | 29 | 2 | 7 | 12 | 17 | Next |
| +5 | 22 | 27 | 0 | 5 | 10 | 15 | 20 | 25 | Next |
| +5 | 30 | 3 | 8 | 13 | 18 | 23 | 28 | 1 | Next |
| +5 | 6 | 11 | 16 | 21 | 26 | 31 | 4 | 9 | End |

In the above example, if the seed value was changed to 10 then the resulting sequence will be as follows:

S(5, 10, 5)=10, 15, 20, 25, 30, 3, 8, 13, 18, 23, 28, 1, 6, 11, 16, 21, 26, 31, 4, 9, 14, 19, 24, 29, 2, 7, 12, 17, 22, 27, 0, 5

The following table, Table 4, illustrates that the values of sequence S(5, 10, 5) are obtained by setting the first value to the seed value (10) and obtaining each subsequent value in the sequence by incrementing the previous value in the sequence by the prime number (5) with modulo $2^{N=5}=32$:

TABLE 4

|  | Start | +5 | +5 | +5 | +5 | +5 | +5 | +5 | |
|---|---|---|---|---|---|---|---|---|---|
| +5 | 10 | 15 | 20 | 25 | 30 | 3 | 8 | 13 | Next |
| +5 | 18 | 23 | 28 | 1 | 6 | 11 | 16 | 21 | Next |
| +5 | 26 | 31 | 4 | 9 | 14 | 19 | 24 | 29 | Next |
| +5 | 2 | 7 | 12 | 17 | 22 | 27 | 0 | 5 | End |

The sequences S(5, 14, 5) and S(5, 10, 5) are basically the same except for the rotation in the positions of their respective values. The values of sequence S(5, 14, 5) can be found starting from value 14 of sequence S(5, 10, 5), which is underlined in Table 4.

However, sequence S(5, 14, 5) does not have any (e.g., 8 KiB) blocks of (e.g., 32-bit) values in common with the sequence S(5, 14, 3) or any other sequence S(5, seed, prime) when the prime is any number other than 5.

The technique described above to generate a sequence is an example and other techniques may be used to generate a sequence using a seed value and a prime number from a constrained modified set of prime numbers.

Figure 4:
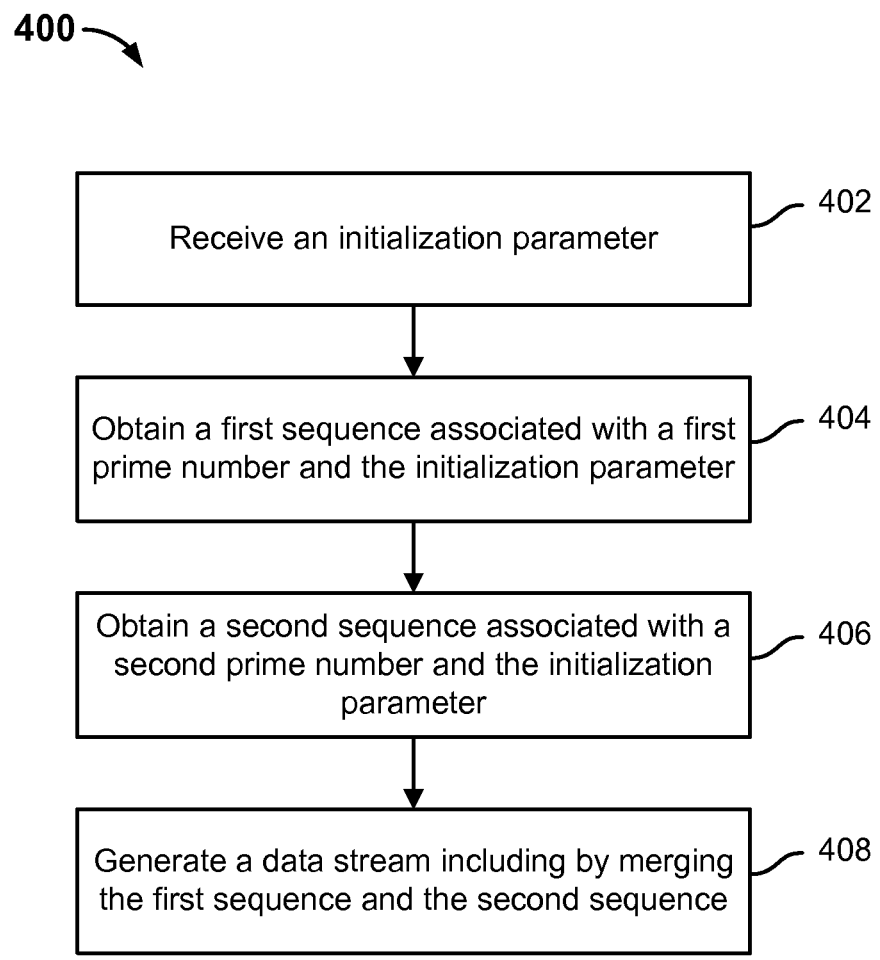
FIG. 4 is a flow diagram showing an embodiment of a process of generating a data stream using prime numbers.

FIG. 4 is a flow diagram showing an embodiment of a process of generating a data stream using prime numbers. In some embodiments, process 400 is implemented at system 100 of FIG. 1. Specifically, in some embodiments, process 400 is implemented at quality assurance server 106 of system 100 of FIG. 1.

At 402, an initialization parameter is received. For example, the initialization parameter can be received from a user input or from a computer program. In some embodiments, the initialization parameter comprises a seed value that is selected from an address space $(0, \ldots, 2^N-1)$, where N is selected to be any positive integer (e.g., 32).

At 404, a first sequence associated with a first prime number and the initialization parameter is obtained. In some embodiments, each of two prime numbers is selected from a modified set of prime numbers that excludes "2" but includes "1" and that is bounded/constrained by $2^N-1$. The two prime numbers may comprise the same prime number or different prime numbers. In some embodiments, the two prime numbers are selected based on a received revision parameter comprising a revision value. In some embodiments, a first sequence is generated using the initialization parameter and one of the two prime numbers using a process such as process 300 of FIG. 3. In some embodiments, the first sequence is received from another entity.

At 406, a second sequence associated with a second prime number and the initialization parameter is obtained. In some embodiments, a second sequence is generated using the initialization parameter and the prime number of the two prime numbers that was not used to generate the first sequence of step 404. In some embodiments, the second sequence is generated using the initialization parameter and the prime number of the two prime numbers that was not used to generate the first sequence using a process such as process 300 of FIG. 3. In some embodiments, the second sequence is received from another entity.

At 408, a data stream is generated including by merging the first sequence and the second sequence. In some embodiments, merging the first sequence and the second sequence includes interleaving the first and second sequences into a new sequence that is referred to as the data stream. In some embodiments, the data stream includes a sequence of alternating values from the first and second sequences. For example, if two sequences are to be merged to become the data stream, and the first sequence comprises {S11, S12, S13, . . . } and the second sequence comprises {S21, S22, S23, . . . }, then merging the first and second sequences will yield the following data stream {S11, S21, S12, S22, S13, S23, . . . }. In some embodiments, the data stream is not deduplicatable.

In some embodiments, more than two prime numbers from the constrained modified set of prime numbers can be selected based on the revision value and the data stream can be generated by merging more than two sequences, each of which is generated using the initialization parameter and a respective prime number.

An example of generating a data stream using an initialization parameter (seed value) and at least two prime numbers is described below:

Two or more S sequences, as described above, can be used to build a new merged sequence (data stream).

For example:

MS2 is a merged sequence (data stream) of two S sequences, and has the following four parameters:

N Address space $(0 \ldots 2^N-1)$, seed The seed value (e.g., the initialization parameter) (the first value) of each of sequence #1 and sequence #2, prime1 A first prime number selected from set PrimeMN for sequence S(N, seed, prime1), prime2 A second prime number selected from set PrimeMN for sequence S(N, seed, prime2).

MS2(N, seed, prime1, prime2)=S(N, seed, prime1)+S(N, seed, prime2)

Similarly, MS3 is a merged sequence (data stream) of three S sequences, sequence #1, sequence #2, and sequence #3, that has five parameters:

N Address space $(0 \ldots 2^N-1)$, seed The seed value (e.g., the initialization parameter) (the first value) of each of sequence #1 and sequence #2, prime1 A first prime number selected from set PrimeMN for sequence S(N, seed, prime1), prime2 A second prime number selected from set PrimeMN for sequence S(N, seed, prime2), prime3 A third prime number selected from set PrimeMN for sequence S(N, seed, prime3).

MS3 (N, seed, prime1, prime2, prime3)=S(N, seed, prime1)+S(N, seed, prime2)+S(N, seed, prime3)

For example, given N=5, seed=14, prime1=3 and prime2=5, the sequence MS2 (5, 14, 3, 5) (data stream) is produced by alternately inserting one value from each individual sequence S(5, 14, 3) and S(5, 14, 5) into a merged sequence.

MS2(5, 14, 3, 5)=14, 14, 17, 19, 20, 24, 23, 29, 26, 2, 29, 7, 0, 12, 3, 17, 6, 22, 9, 27, 12, 0, 15, 5, 18, 10, 21, 15, 24, 20, 27, 25, 30, 30, 1, 3, 4, 8, 7, 13, 10, 18, 13, 23, 16, 28, 19, 1, 22, 6, 25, 11, 28, 16, 31, 21, 2, 26, 5, 31, 8, 4, 11, 9

The following table, Table 5, illustrates that the values of data stream MS2(5, 14, 3, 5) are obtained by alternately inserting a value from sequence S(5, 14, 3) and a value from sequence S(5, 14, 5) (the values of each sequence are individually displayed with Table 1 and Table 3, above) into a merged sequence:

TABLE 5

| Start | Start | +3 | +5 | +3 | +5 | +3 | +5 |
|---|---|---|---|---|---|---|---|
| 14 | 14 | 17 | 19 | 20 | 24 | 23 | 29 |
| 26 | 2 | 29 | 7 | 0 | 12 | 3 | 17 |
| 6 | 22 | 9 | 27 | 12 | 0 | 15 | 5 |
| 18 | 10 | 21 | 15 | 24 | 20 | 27 | 25 |
| 30 | 30 | 1 | 3 | 4 | 8 | 7 | 13 |
| 10 | 18 | 13 | 23 | 16 | 28 | 19 | 1 |
| 22 | 6 | 25 | 11 | 28 | 16 | 31 | 21 |
| 2 | 26 | 5 | 31 | 8 | 4 | 11 | 9 |

Note in Table 5 above, the values from sequence S(5, 14, 5) are shown in italics while the values from sequence S(5, 14, 3) are not shown in italics.

In another example, given N=5, seed=10, prime1=3 and prime2=5, the sequence MS2(5, 10, 3, 5) is produced by alternately inserting one value from each of individual sequences S(5, 10, 3) and S(5, 10, 5) into a merged sequence.

MS2(5, 10, 3, 5)=10, 10, 13, 15, 16, 20, 19, 25, 22, 30, 25, 3, 28, 8, 31, 13, 2, 18, 5, 23, 8, 28, 11, 1, 14, 6, 17, 11, 20, 16, 23, 21, 26, 26, 29, 31, 0, 4, 3, 9, 6, 14, 9, 19, 12, 24, 15, 29, 18, 2, 21, 7, 24, 12, 27, 17, 30, 22, 1, 27, 4, 0, 7, 5

The following table, Table 6, illustrates that the values of data stream MS2(5, 10, 3, 5) are obtained by alternately inserting a value from sequence S(5, 10, 3) and a value from sequence S(5, 10, 5) (the values of each sequence are individually displayed with Table 2 and Table 4, above) into a merged sequence:

TABLE 6

| Start | Start | +3 | +5 | +3 | +5 | +3 | +5 |
|---|---|---|---|---|---|---|---|
| 10 | 10 | 13 | 15 | 16 | 20 | 19 | 25 |
| 22 | 30 | 25 | 3 | 28 | 8 | 31 | 13 |
| 2 | 18 | 5 | 23 | 8 | 28 | 11 | 1 |
| 14 | 6 | 17 | 11 | 20 | 16 | 23 | 21 |
| 26 | 26 | 29 | 31 | 0 | 4 | 3 | 9 |
| 6 | 14 | 9 | 19 | 12 | 24 | 15 | 29 |
| 18 | 2 | 21 | 7 | 24 | 12 | 27 | 17 |
| 30 | 22 | 1 | 27 | 4 | 0 | 7 | 5 |

Note in Table 6 above, the values from sequence S(5, 10, 5) are shown in italics while the values from sequence S(5, 10, 3) are not shown in italics.

It was shown above that sequences S(N, seed1, prime) and S(N, seed2, prime) included the same values except for the rotation in the positions of their respective values. This does not hold true for the data stream, MS2. As shown with the two examples of data stream MS2, each seed value produces an entirely new data stream. Note that the pattern/consecutive values of 14 and 14 appear only in data stream MS2(5, 14, 3, 5) and not in merged sequence data stream MS2(5, 10, 3, 5).

Using the merging of two sequences as described above, $2^N$ data streams (one for each seed value in the address space) can be generated for any given pair of prime numbers (prime1, prime2). Each data stream determined from merging two sequences has $2*2^N$ values.

Assume that N=32 (the most often used size in bits of an unsigned integer) then the length of the data stream MS2(32, seed, prime1, prime2) will be as follows:

$2*(2^{32})$ unsigned integers of 32 bit size or $4*2*(2^{32})$ bytes≈32 gigabytes (GiB).

As such, a data stream MS2(32, seed, prime1, prime2) will repeat after exactly 32 GiB. Put another way, each seed value will provide a new data stream and if N=32, then $2^{32}$ seed values are available to use to build approximately 4 billion data streams where each data stream will be exactly 32 GiB long.

In some embodiments, each revision value (e.g., the revision parameter) with respect to a given seed value uniquely maps to a first prime number of a fixed value and a second prime number that is associated with a position within the constrained modified set of prime numbers that matches the revision value. For example, each pair of prime numbers can be represented by (prime1, prime2). For example, given seed=10; revision 0 can map to the pair of prime1=3 and prime2=1, revision 1 can map to the pair of prime1=3 and prime2=3, revision 2 can map to the pair of prime1=3 and prime2=5, revision 4 can map to the pair of prime1=3 and prime2=7, and so forth.

In some embodiments, each revision value (which maps to a different pair of prime numbers (prime1, prime2)) for a given seed value can be used to generate a data stream that is distinct from any data stream that is generated from the same seed value and any other revision value. In some embodiments, each revision value (which maps to a different pair of prime numbers (prime1, prime2)) for a given seed value can be used to generate a data stream that is distinct from any data stream that is generated from any other seed value and revision value.

Because for a given seed value, merged sequence data stream MS2(32, seed, prime1, prime2) will repeat after approximately 32 GiB, if the desired application of the data stream requires a data stream to be longer than 32 GiB, then one or more enhancements can be performed to increase the length of the data stream.

Below are some example enhancements that can be performed to increase the length of a data stream:

Enhancement #1:

MS2 comprises two simple sequences S(N, seed, prime1) and S(N, seed, prime2).

This enhancement automatically alters the prime used for the first sequence (prime1) to a new value when the repetition is about to occur.

This enhancement allows for a very large sequence to be built as long as we have a prime number available.

Enhancement #2:

Let each value of a sequence be represented by 64 bits. Therefore, let N=64 (instead of N=32). Where N=64, a generated data stream will not repeat for approximately $2*(2^{N=64}))$ unsigned integers of 64 bit size or $8*2*(2^{64})$ bytes≈256 exabytes.

Enhancement #3:

More than two sequences are merged together to generate a data stream.

For example:

A merged sequence data stream that includes three sequences can be represented as MS3(N, seed, prime1, prime2, prime3).

Depending on the merging mode utilized, this can produce extremely long sequences.

The technique described above to generate a data stream is an example and other techniques may be used to generate a data stream using a seed value and at least two prime numbers selected from a constrained modified set of prime numbers.

In some embodiments, as described above, each seed value can be used to generate data streams that are distinct from data streams generated with any other seed values and a given seed value with a revision value can be used to generate a data stream that is distinct from a data stream generated with the given seed value and any other revision value. Therefore, in certain applications, different seed values and/or revision values can be assigned to different users involved in performing quality assurance such that each group of users and/each user in a group can perform testing on their respective data stream (generated with a given seed value and revision value) without impacting the testing performed by any other user. For example, each group of users (e.g., in a quality assurance team) can be assigned a seed value and each user within a group can be assigned a revision value with respect to that group's assigned seed value so each user within the group can use their respectively assigned seed value and revision value to generate a data stream distinct from each other's.

In some embodiments, a data stream comprising the merging (e.g., interleaving) of two (or more) sequences can be generated in memory using a small memory footprint. Below is pseudocode that describes one example implementation of a data stream generation engine as described in some embodiments:

The following four variables can be created and stored in memory:

prime1
  prime2
  accumulator1
  accumulator2

The inputs to the data stream generation engine are seed (e.g., the initialization parameter), prime1 (e.g., a first prime number), and prime2 (e.g., a second prime number). The variables are initialized using the input parameters:

Set accumulator1=seed
  Set accumulator2=seed
  Set accumulator1=accumulator1+prime1
  Set accumulator2=accumulator2+prime2

As will be shown in further detail below, accumulator1 represents the values from a first sequence generated using seed and prime1 and accumulator2 represents the values from a second sequence generated using seed and prime2.

The values of the data stream are generated by alternately outputting a value from each of the two sequences. As such, in the pseudocode below, the data stream is generated by alternately outputting a value from each of accumulator1 and accumulator2 and modifying both accumulator1 and accumulator2 after outputting from accumulator1 and accumulator2. The below pseudocode for outputting the values of the data stream can be repeated until a stop condition is met (e.g., the stop condition can be that either of the output of accumulator1 or accumulator2 is the same as a value previously output by accumulator1 or accumulator2, respectively, which indicates that the values of the data stream are starting to repeat).

Output accumulator1
  Output accumulator2
  Set accumulator1=accumulator1+prime1
  Set accumulator2=accumulator2+prime2

The data stream generation as described in the above example implementation is extremely fast because only two ADD operations are used.

Embodiments of verifying a data stream are described herein. In various embodiments, a data stream generated in accordance with the embodiments described above can be verified without another copy (e.g., a master copy) of the data stream and without the parameters that were used to generate the data stream (e.g., the initialization parameter, a first prime number, a second prime number). A verification capability that does not require another copy (e.g., a master copy) of the data stream for comparison purposes is invaluable for proving the correctness of a storage system. For example, a verification capability that does not require another copy of the data stream for comparison purposes (or even the parameters that were used to generate the data stream) can free up storage space that would have otherwise been used to store the other copy of the data stream and/or the parameters. In various embodiments, verification can be performed on any part of a data stream. A self-verification capability is valuable for proving the store and restore capabilities of a storage system.

A data stream may be verified for correctness in various different applications. For example, to verify a data stream for correctness is to confirm that the data stream is actually the merging (e.g., interleaving) of two sequences (e.g., each of which is generated using a process such as process 300 of FIG. 3, above). In a first example application, data stored at a storage device associated with a data stream is restored and the restored version of the data stream can be verified to test the effectiveness of storing and/or restoring techniques. In a second example application, a newly generated data stream can be verified to confirm that the data stream had been correctly generated.

Figure 5:
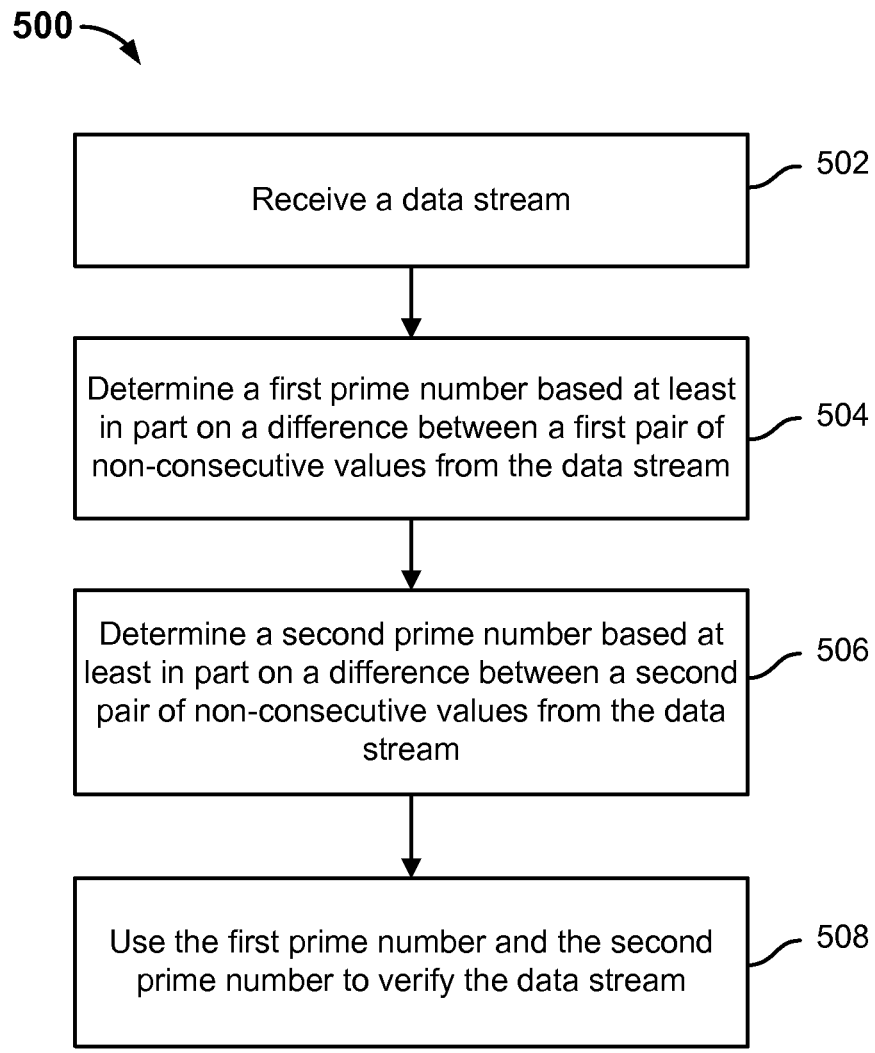
FIG. 5 is a flow diagram showing an embodiment of a process of verifying a data stream.

FIG. 5 is a flow diagram showing an embodiment of a process of verifying a data stream. In some embodiments, process 500 is implemented at system 100 of FIG. 1. Specifically, in some embodiments, process 500 is implemented at quality assurance server 106 of system 100 of FIG. 1.

Process 500 describes an example of performing verification on a data stream that was generated by merging (e.g., interleaving) two sequences (e.g., using a process such as process 400 of FIG. 4). As will be described in further detail below, process 500 deduces the two prime numbers associated with the respective two sequences and uses these two prime numbers to verify the data stream.

At 502, a data stream is received. For example, the data stream is restored from data stored at a storage device (e.g., by a quality assurance server such as quality assurance server 106 of system 100 of FIG. 1). In another example, the data stream is recently generated (e.g., by a quality assurance server such as quality assurance server 106 of system 100 of FIG. 1).

At 504, a first prime number is determined based at least in part on a difference between a first pair of non-consecutive values from the data stream. Each of the two sequences that were interleaved to generate the data stream is based on a prime number and the initialization parameter (e.g., seed value). Each of the two sequences initially starts with the seed value plus the prime number associated with that sequence and each subsequent value is generated by a prior value plus the prime number associated with that sequence. As such, the difference between every other value of the data stream should equal one of the two prime numbers associated with the sequences that were interleaved to form the data stream. For example, a first prime number can be deduced as the difference between a pair of values of the data stream that are separated by a value (e.g., the Xth and (X+2)th values of the data stream).

At 506, a second prime number is determined based at least in part on a difference between a second pair of non-consecutive values from the data stream. Similarly, a second prime number can be deduced as the difference between another pair of values of the data streams that are separated by a value (e.g., the (X+1)th and (X+3)th values of the data stream).

At 508, the first prime number and the second prime number are used to verify the data stream. Once the first and second prime numbers have been deduced, the data stream (or any portion thereof) can be verified based on determining whether the difference between pairs of values separated by a value of the data stream matches one of the first and second prime numbers. In some embodiments, while the initialization parameter comprising a seed value was used to generate the data stream, the seed value is not used in verifying the data stream and therefore does not need to be determined.

In some embodiments, a data stream consists of two interleaved sequences each based upon their own prime number resulting in a data stream that is not deduplicatable. For example, each sequence starts with the seed value (seed) plus their individual prime (prime1 or prime2) and subsequent values are generated by the prior value plus their individual prime. Therefore, the values in a data stream in some embodiments are (where value[X] represents the value in position X in the data stream):

seed (in hexadecimal)=0E00000E, prime1 (in hexadecimal)=0103050D, prime2 (in hexadecimal)=0305070B
  value1=seed+prime1 0F03051B=0E00000E+0103050D
  value2=seed+prime2 11050719=0E00000E+0305070B
  value3=value1+prime1        10060A28=0F03051B+0103050D
  value4=value2+prime2        140A0E24=11050719+0305070B
  value5=value3+prime1        11090F35=10060A28+0103050D
  value6=value4+prime2        170F152F=140A0E24+0305070B
  value7=value5+prime1 120C1442=11090F35+0103050D
  value8=value6+prime2        1A141C3A=170F152F+0305070B In this data stream, the first value and every other value are from the sequence generated with prime1 (the values above written in bold) and the second value and every other value are from the sequence with prime2 (the values written not in bold).

The difference of the Xth and (X+2)th values is either prime1 if the Xth value was from the first sequence or prime2 if the Xth value was from the second sequence.

seed (in hexadecimal)=0E00000E, prime1 (in hexadecimal)=0103050D, prime2 (in hexadecimal)=0305070B
  value3−value1=prime1        10060A28−0F03051B=0103050D
  value4−value2=prime2        140A0E24−11050719=0305070B
  value5−value3=prime1        11090F35−10060A28=0103050D
  value6−value4=prime2        170F152F−140A0E24=0305070B
  value7−value5=prime1 120C1442−11090F35=0103050D
  value8−value6=prime2        1A141C3A−170F152F=0305070B As shown above, four consecutive values of the data stream are enough to determine the two prime numbers (prime1 and prime2). Once the values of prime1 and prime2 are deduced, the correctness of the entire data stream can be established as all subsequent values must be equal to the prior value plus an alternating prime1 and prime2 value.

For verification, the input can be at least a portion from the start or middle of the data stream. In various embodiments, values for prime1 and prime2 can be deduced and the entire data stream verified as long as a minimum of four values of the data stream are made available.

The following is pseudocode that shows the example steps that will cause the portion of the data stream comprising value3, value4, value5, value6, value7 and value8 to be verified. Note: The data stream started with value1 but the data stream verification is being attempted from value3.
  Input: value3
  save value3 in accumulator1
  Input: value4
  save value4 in accumulator2
  Input: value5
  save difference of value5 and accumulator1 in prime1
  save value5 in accumulator1
  Input: value6
  save difference of value6 and accumulator2 in prime2
  save value6 in accumulator2
  At this point, the prime1 and prime2 values are deduced.
  Input: value7
  ensure that the difference of value7 and accumulator1 equals prime1
  save value7 in accumulator1
  Input: value8
  ensure that the difference of value8 and accumulator2 equals prime2
  save value8 in accumulator2

As shown above, in some embodiments, prime1 and prime2 associated with a data stream to be verified can be derived just from four (e.g., initial) values of the data stream. In some embodiments, the seed value can also be derived using the (e.g., initial) four values and the values for the prime1 and prime2. In various embodiments, the seed value is not required for verification but can be deduced and reported (e.g., to enable the regeneration of the exact same data stream if desired).

If prime1 is repeatedly added to the first value of the data stream and prime2 is repeatedly added to the second value of the data stream and when both the accumulators are equal, the seed is found.

Since the initial value of each interleaved sequence is value=seed+prime and all succeeding values are value=value+prime, given enough additions of prime to value, value will at some point be equal to seed due to modulo arithmetic wrap around.

Therefore, the seed can be deduced by repeatedly performing the following additions, described in pseudocode, as required:
  value_from_prime1_sequence=value_from_prime1_sequence+prime1
  value_from_prime2_sequence=value_from_prime2_sequence+prime2
  Until
value_from_prime1_sequence=value_from_prime2_sequence. The two values will be equal only when they are both equal to the seed value, seed.

In some embodiments, a data stream comprising the merging (e.g., interleaving) of two (or more) sequences can be verified in memory using a small memory footprint. Below is pseudocode that describes one example implementation of a data stream verification engine as described in some embodiments:

The following six variables can be created and stored in memory:
prime1
prime2
accumulator1
accumulator2
next_step=Initialization#1
result=true In step Initialization#1, accumulator1 is initialized by inputting a first value of the data stream to be used in the verification process:
Set accumulator1=value
Set next_step=Initialization#2

In step Initialization#2, accumulator2 is initialized by inputting a next value of the data stream:
Set accumulator2=value
Set next_step=Initialization#3

In step Initialization#3, the difference between a next value of the data stream and accumulator1 is set as prime1:
Set prime1=value−accumulator1
Set accumulator1=value
Set next_step=Initialization#4

In step Initialization#4, the difference between a next value of the data stream and accumulator2 is set as prime2:
Set prime2=value−accumulator2
Set accumulator2=value
Set next step=Verify#1

In step Verify#1, it is checked whether the difference between the next value of the data stream and accumulator1 equals prime1:
if (value−accumulator1) does not equal prime1 then set result to false
Set accumulator1=value
Set next step as Verify#2

In step Verify#2, it is checked whether the difference between the next value of the data stream and accumulator2 equals prime2:
if (value−accumulator2) does not equal prime2 then set result to false
Set accumulator2=value
Set next step as Verify#1

Verify#1 and Verify#2 are alternately performed until a stop condition is met (e.g., there end of the data stream has been reached). If result is ever set to false, then the data stream cannot be verified to be correct. However, if result remains set to true after the stop condition is met, then the data stream is verified to be correct.

The data stream verification as described in the above example implementation is extremely fast because only a few subtraction operations are used.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor configured to:
receive an initialization parameter, wherein the initialization parameter is a value selected from a constrained address space, wherein the constrained address space limits the value of numbers in a sequence;
generate a data stream using the initialization parameter, wherein to generate the data stream, the processor is further configured to merge a first sequence and a second sequence, wherein to merge the first sequence and the second sequence into the data stream includes to alternate between a number of the first sequence and a number of the second sequence, wherein the first sequence is generated using a first prime number and the initialization parameter and the second sequence is generated using a second prime number and the initialization parameter, wherein a first number of a sequence is based on the initialization parameter and a subsequent number of the sequence is based on a previous number of the sequence and a corresponding sequence prime number;
send the data stream to be stored at a storage device;
receive restored data associated with the data stream from the storage device;
determine the first prime number and the second prime number based on the restored data at least in part by:
a first determination of a first offset between odd ordinal numbers of the data stream and a second offset between even ordinal numbers of the data stream;
a second determination of whether the first offset is equal to the first prime number and the second offset is equal to the second prime number; and
in response to determining the first offset is equal to the first prime number and the second offset is equal to the second prime number, verify the data stream without a copy of the data stream and without the initialization parameter, the prime number and the second prime number; and
a memory coupled to the processor and configured to store the initialization parameter.

2. The system of claim 1, wherein the initialization parameter comprises a user input.

3. The system of claim 1, wherein the initialization parameter is used as a first value in at least one of the first sequence and the second sequence.

4. The system of claim 1, wherein the first and second prime numbers are selected from a constrained modified set of prime numbers comprising a set of prime numbers including "1" and excluding "2" and that is constrained by $2^N-1$, where N is a positive integer.

5. The system of claim 1, wherein the data stream is non-deduplicatable.

6. The system of claim 1, wherein the processor is further configured to generate the first sequence including by generating a first value of the first sequence as a combination of the initialization parameter and the first prime number and a second value of the first sequence as a combination of the first value and the first prime number.

7. The system of claim 1, wherein the processor is further configured to generate the second sequence including by generating a first value of the second sequence as a combination of the initialization parameter and the second prime number and a second value of the second sequence as a combination of the first value and the second prime number.

8. The system of claim 1, wherein the processor is further configured to:
receive a revision parameter; and
use the revision parameter to select the first prime number and the second prime number from a constrained modified set of prime numbers.

9. A method, comprising:
receiving an initialization parameter, wherein the initialization parameter is a value selected from a constrained address space, wherein the constrained address space limits the value of numbers in a sequence;
generating, by a processor, a data stream using the initialization parameter, wherein generating the data stream comprises merging of a first sequence and a second sequence, wherein merging the first sequence and the second sequence into the data stream includes alternating between a number of the first sequence and a number of the second sequence, wherein the first sequence is generated using a first prime number and the initialization parameter and the second sequence is generated using a second prime number and the initialization parameter, wherein a first number of a sequence is based on the initialization parameter and a subsequent number of the sequence is based on a previous number of the sequence and a corresponding sequence prime number;
sending the data stream to be stored at a storage device;
receiving restored data associated with the data stream from the storage device;
determining the first prime number and the second prime number based on the restored data based on the restored data at least in part by:
determining a first offset between odd ordinal numbers of the data stream and a second offset between even ordinal numbers of the data stream;
determining whether the first offset is equal to the first prime number and the second offset is equal to the second prime number and
in response to determining the first offset is equal to the first prime number and the second offset is equal to the second prime number, verifying the data stream without a copy of the data stream and without the initialization parameter, the first prime number and the second prime number.

10. The method of claim 9, wherein the first and second prime numbers are selected from a constrained modified set of prime numbers comprising a set of prime numbers including "1" and excluding "2" and that is constrained by $2^N-1$, where N is a positive integer.

11. The method of claim 9, wherein the data stream is non-deduplicatable.

12. The method of claim 9 further comprising generating the first sequence including by generating the first value of the first sequence as a combination of the initialization parameter and the first prime number and a second value of the first sequence as a combination of the first value and the first prime number.

13. The method of claim 9 further comprising generating the second sequence including by generating the first value of the second sequence as a combination of the initialization parameter and the second prime number and a second value of the second sequence as a combination of the first value and the second prime number.

14. The method of claim 9 further comprising:
receiving a revision parameter; and
using the revision parameter to select the first prime number and the second prime number from a constrained modified set of prime numbers.

15. A computer program product, the computer program product embodied in a non-transitory computer readable storage medium and comprising computer instructions for:
receiving an initialization parameter, wherein the initialization parameter is a value selected from a constrained address space, wherein the constrained address space limits the value of numbers in a sequence, wherein a first number of a sequence is based on the initialization parameter and a subsequent number of the sequence is based on a previous number of the sequence and a corresponding sequence prime number;
generating a data stream using the initialization parameter, wherein generating the data stream comprises merging of a first sequence and a second sequence, wherein merging the first sequence and the second sequence into the data stream includes alternating between a number of the first sequence and a number of the second sequence, wherein the first sequence is generated using a first prime number and the initialization parameter and the second sequence is generated using a second prime number and the initialization parameter;
sending the data stream to be stored at a storage device;
receiving restored data associated with the data stream from the storage device;
determining the first prime number and the second prime number based on the restored data at least in part by:
determining a first offset between odd ordinal numbers of the data stream and a second offset between even ordinal numbers of the data stream;
determining whether the first offset is equal to the first prime number and the second offset is equal to the second prime number; and
in response to determining the first offset is equal to the first prime number and the second offset is equal to the second prime number, verifying the data stream without a copy of the data stream and without the initialization parameter, the first prime number and the second prime number.

* * * * *

UNITED STATES PATENT AND TRADEMARK OFFICE
CERTIFICATE OF CORRECTION

PATENT NO. : 10,114,850 B1
APPLICATION NO. : 14/489295
DATED : October 30, 2018
INVENTOR(S) : Salil Dangi et al.

Page 1 of 1

It is certified that error appears in the above-identified patent and that said Letters Patent is hereby corrected as shown below:

In the Specification

In Column 08, Line 54, delete "14" and insert --14--, therefor.
In Column 09, Line 36, delete "14" and insert --14--, therefor.

Signed and Sealed this
Ninth Day of April, 2019

Andrei Iancu
*Director of the United States Patent and Trademark Office*